United States Patent Office 2,777,823
Patented Jan. 15, 1957

2,777,823
IRON CATALYST FOR CATALYTIC CARBON MONOXIDE HYDROGENATION

Walter Rottig, Oberhausen-Sterkrade-Nord, Germany, assignor to Ruhrchemie Aktiengesellschaft, Oberhausen-Holten, Germany, and Lurgi Gesellschaft fuer Waermetechnik m. b. H., Frankfurt am Main Heddernheim, Germany, a German corporation No Drawing. Application March 26, 1952,
Serial No. 278,740

Claims priority, application Germany April 5, 1951

3 Claims. (Cl. 252—459)

This invention relates to improvements in iron catalyst for catalytic carbon monoxide hydrogenation. It more particularly relates to a new, improved carbon monoxide hydrogenation catalyst and a novel method for its production.

Iron catalysts for the catalytic hydrogenation of carbon monoxide are well known and various methods have been described for their production. These conventional iron catalysts may contain small amounts of carrier materials and activating metals, such as copper.

An iron catalyst for the hydrogenation of carbon monoxide with a high gas load has been described. This catalyst is produced by a special process and involves a combination of very specific steps. According to this process, an iron nitrate solution is precipitated with caustic soda at a pH value of about 7. The precipitated material is then thoroughly washed and impregnated with alkali silicate so that the finished catalyst will contain $K_2O$ and $SiO_2$ in the ratio of approximately 1:4 to 1:5 to each other. This critical ratio of $K_2O$ to $SiO_2$ is obtained in accordance with said process by impregnating the catalyst with water glass. Commercial water glass has a $K_2O$ to $SiO_2$ ratio of about 1 to about 2.6. A subsequent reneutralization is therefore necessary. This reneutralization is effected with diluted nitric acid followed by filtration and permits the $K_2O:SiO_2$ ratio to be adjusted as desired with the excess alkali contained in the filtrate in the form of potassium nitrate.

This process is described in detail in U. S. application Ser. No. 184,114.

One object of this invention is a production of a catalyst having superior activity to catalysts produced by the above described method.

A further object of this invention is to reduce the material cost in the above-described process.

A still further object of this invention is to eliminate the operational step of reneutralization which is necessary in the above-described process.

A still further object is the production of catalysts with superior mechanical strength, and further improvements as compared with the catalyst produced by the above-described process.

These, and still further objects will become apparent from the following description:

In accordance with the invention an iron hydroxide suspension is produced, as, for example, in the same manner as in the above-mentioned process, by precipitation from an iron nitrate solution with caustic soda at a pH of about 7. A portion of 20 to 25 parts of $SiO_2$ for each 100 parts of iron is then added to the iron hydroxide suspension. This portion of the total silicic acid is first added as silicic acid of another kind than water glass, such as in the form of activated bleaching earth. A water glass solution containing the remainder of the total silicic acid is then added as alkali in amount sufficient to produce a ratio of $K_2O:SiO_2$ in the finished catalyst of about 1:4 and about 1:5 without the necessity of reneutralization with nitric acid.

The portion of the total silicic acid introduced in another form as compared to the portion introduced as water glass, depends on the composition of the water glass and the amount of the alkali water glass desired. The total silicic acid must be equal to about 20 to 25 parts for every 100 parts by weight of the iron contained in the iron hydroxide suspension. The ratio of $K_2O$ to $SiO_2$ in the catalyst mass remaining after filtration, must be of about 1:4 to about 1:5. After the introduction of the silicic acid in a form other than water glass, the water glass must be added in quantities so that a total of 20 to 25 parts of $SiO_2$ for every 100 parts by weight of iron contained in the suspension is present, and so that no reneutralization is necessary. These factors clearly determined the relative amounts of silicic acid as water glass and silicic acid in another form, as, for example, activated bleaching earth. The skilled artisan will have no difficulty in determining these proportions from the above.

The iron catalyst produced in accordance with the invention may contain small amounts of carrier material and the usual quantities of copper and other activating metals. The ranges and amounts of these carrier materials and activating materials and their mode of introduction is well known in the art, and a detailed description of these ranges and modes of introduction is not necessary.

It is apparent that the method for the production of the catalyst in accordance with the invention is identical to the method described above and in U. S. application Ser. No. 184,114 except that in the method according to U. S. application Ser. No. 184,114 the iron hydroxide suspension was admixed with a potassium water glass solution in amounts sufficient to yield 20 to 25 parts of $SiO_2$ for every 100 parts by weight of iron contained in the suspension, followed by a treatment with nitric acid for reneutralization and to produce a ratio of 1:4 to 1:5 of $K_2O$ to $SiO_2$ in the catalyst mass remaining after filtration, while in the method according to the invention, a part of the total silicic acid is introduced as silicic acid of another kind and the alkali is added as water glass in the quantities desired, which eliminates the reneutralization by nitric acid.

Except for the method of the introduction of the silicic acid and the elimination of the reneutralization by nitric acid, all other conditions, amounts and ranges in the instant invention may be the same as those disclosed in U. S. patent application Ser. No. 184,114, now U. S. Patent 2,617,774.

In practice, a quantitative determination is first made of the amount of silicic acid present in a bleaching earth. Then the quantity of silicic acid which must be contained in the catalyst mass in excess of the $K_2O$ to $SiO_2$ ratio present in the water glass is calculated. A quantity of bleaching earth containing this amount of silicic acid is then immediately stirred into the catalyst mass upon precipitation. The impregnation is then effected in the form of a direct impregnation with water glass without reneutralization. This means to be the best form of practice. The catalyst is then worked into final form in the conventional known manner.

The catalyst thus formed has not only improved activity over the catalyst described in U. S. patent application Ser. No. 184,114, but the material cost for production is substantially reduced and the operational step of reneutralization is eliminated. In addition, the mechanical strength of the new catalyst is far superior to that of the catalyst described in U. S. patent application Ser. No. 184,114.

Bleaching earths are understood to be clay-like aluminium hydrosilicates having a varying content of magnesium, calcium, and iron. Distinction is made between natural earths which can directly be used after drying and grinding for many purposes, and activated earths which become particularly effective by a chemical treatment. On an average, these earths contain 50–75% $SiO_2$, 5–15% $Al_2O_3$, 3–12% CaO or MgO in addition to small amounts of $Fe_2O_3$, $TiO_2$, $K_2O$ and $Na_2O$. Activated commercial bleaching earths are known under the trade names of Filtrol, Superfiltrol, Granusil, Tonsil, Filter-Cel etc. Other materials than these activated bleaching earths, such as Sterchamol, ceramic masses, etc. may also be used in accordance to the invention. The composition of some bleaching earths is given as follows:

(1) Tonsil:

| | |
|---|---|
| $SiO_2$ | 62.3 |
| $Al_2O_3$ | 13.4 |
| $Fe_2O_3$ | 2.6 |
| CaO | 0.6 |
| MgO | 2.1 |
| $Na_2O$, $K_2O$ | 0.4 |
| Loss at red | — |
| Heat | 7.3 |
| $H_2O$ | 11.3 |

(2) Filter-Cel (standard):

| | |
|---|---|
| Loss at red heat | 0.41 |
| $H_2O$ | 1.13 |
| $Fe_2O_3$ | 0.89 |
| $Al_2O_3$ | 3.06 |

Balance $SiO_2$.

(3) Analysis of another commercial bleaching earth brought to maximum activity by means of mineral acid:

| | |
|---|---|
| $SiO_2$ | 73.64 |
| $Al_2O_3$ | 13.46 |
| $Fe_2O_3$ | 6.35 |
| CaO | — |
| Loss at red heat | 6.63 |

In accordance with the invention it has been found that the composition of the bleaching earth used or of the other siliceous materials has a considerable influence on the behavior of the catalyst during the synthesis. The composition of the primary products obtained is also dependent upon this composition.

It has thus been found that particularly favorable synthesis results may be obtained with the new catalyst if bleaching earths are used in their preparation which have a relatively low aluminum oxide content of less than 10% by weight and preferably of less than 5% by weight. These earths should, in addition, have a rather high CaO content of more than 5% by weight and preferably more than 10% by weight.

If the new catalyst contained a high aluminum oxide content, an increased methane formation and the formation of products with a somewhat lower olefin content results during the synthesis. On the other hand, a reduced methane formation and an increased yield of unsaturated aliphatic hydrocarbons is produced with the use of the new catalyst with a correspondingly low content of calcium oxide.

The following examples are given by way of illustration and not limitation of the invention:

*Example 1*

1000 liters of a hot iron solution containing per liter approximately 40 gms. of Fe in the form of $Fe(NO_3)_3$ and 0.2 g. Cu in the form of $Cu(NO_3)_2$ were admixed with 1050 liters of a hot solution containing per liter approximately 100 gms. of $Na_2CO_3$ while vigorously stirring the mass. The stirring of the mixture was continued until the escape of the forming carbon dioxide. Immediately thereafter, the mixture was stirred up with 6.8 kilos of an activated bleaching earth known under the trade mark "Tonsil." With a content of 65.6% of silicic acid in the Tonsil, approximately 4.447 kilos of $SiO_2$ were thereby added to the catalyst. A pH value of 7 was maintained during and after the precipitation.

Immediately thereafter, the precipitated catalyst mass was freed from the mother liquor in a filter press and subsequently washed with hot condensate for approximately 70 minutes. Thereafter, the residual content of alkali in the catalyst mass was 0.45% calculated as $K_2O$ and based on the total iron present.

Now the precipitated catalyst mass was directly impregnated with a diluted potassium water glass solution in such a manner that 5.57 parts of $K_2O$ corresponding to 15 parts of $SiO_2$ (composition of the approximately 20% commercial potassium water glass solution) for every 100 parts of Fe were contained in the catalyst mass. The impregnation was carried out in such a manner that, by carefully kneading in the potassium water glass solution, the distribution in the precipitated catalyst slurry was an uniform as possible. Then the catalyst mass was carefully dried to a water content of 60% and molded in an extruding press into cylindrical grains of 5 mm. size. After short-time redrying in a belt drier, the grains were finally dried in a drying chamber for 24 hours at a temperature of 105° C. to a water content of 4%.

Considering the quantity of silicic acid (4.47 kilos) added to the catalyst by the Tonsil and adding thereto the quantity of silicic acid (6 kilos) added by the direct impregnation with potassium water glass, the total quantity of silicic acid is 10.47 kilos in 40 kilos of Fe, i. e. 26% calculated on Fe; the quantity of $K_2O$ is 2.23 kilos corresponding to 5.77% and the $K_2O:SiO_2$ ratio is 1:4.5.

By crushing and sieving the dried mass, a finished grain of 5 mm. was obtained. This catalyst was reduced in a reduction apparatus for 75 minutes at a temperature of 320° C., using 95 cu. m. of a gas mixture consisting of 75 parts of $H_2$ and 25 parts of $N_2$. The flow rate during the reduction was 1.4 m., measured in the cold state. The reduction value after the reduction was 28% Fe.

When this catalyst was charged to a reaction furnace of 12 M. in length and consisting of smooth tubes of 32 mm. diameter and was brought to reaction using a pressure of 30 atmospheres, a recycle ratio of 1+3 and a gas load of 500 volumes water gas per volume of catalyst per hour, a conversion of 60% $CO+H_2$ was obtained at a reaction temperature of 227° C.

When the same catalyst was prepared according to U. S. application Ser. No. 184,114, U. S. Patent No. 2,617,774, without the addition of Tonsil, but merely by potassium water glass impregnation and subsequent reneutralization, and reduced and operated under the same reduction and synthesis conditions, respectively, a reaction temperature of 223° C. was required to obtain the same conversion.

With the catalyst according to the invention, the methane formation was correspondingly lower, the yield of high boiling hydrocarbons was higher and the catalyst life was markedly increased.

*Example 2*

While the catalyst of Example 1 was prepared using a German bleaching earth which, in addition to approximately 60% of silicic acid, contained approximately 12% of water, smaller amounts of iron oxide, magnesium oxide and calcium oxide, and approximately 22% of aluminum oxide, a new catalyst was prepared having the same composition, but the activated bleaching earth used in this case was composed as follows: Approximately 63% of silicic acid, 7% of aluminum oxide, 3.5% of iron oxide, 7.5% calcium oxide, 2.3% of magnesia oxide, smaller amounts of alkali, titanic acid etc. and 14% of water.

The catalyst prepared with this bleaching earth had an approximately 2° C. lower synthesis temperature as compared to that of the catalyst prepared according to Example 1. The paraffin formation was somewhat higher. The formation of $C_1$ and $C_2$ hydrocarbons was approximately 15% lower as compared to that of the catalyst of Example 1.

I claim:

1. In a method for the production of precipitated iron catalyst for the catalytic hydrogenation of carbon monoxide having a ratio of alkali oxide to $SiO_2$, calculated as $K_2O:SiO_2$ of 1:4 to 1:5, the improvements which comprises adding to an iron hydroxide suspension of siliceous material other than potassium water glass consisting predominantly of $SiO_2$ and additionally $SiO_2$ in the form of potassium water glass, said siliceous material and said potassium water glass being added in proportional amounts sufficient to produce a ratio of 20–25 parts by weight of $SiO_2$ for each 100 parts by weight of iron, and recovering a catalyst having a ratio of alkali oxide to $SiO_2$ calculated as $K_2O:SiO_2$ of 1:4 to 1:5.

2. Improvement according to claim 1, in which said siliceous material is an activated bleaching earth.

3. Improvement according to claim 2, in which said bleaching earth has an aluminum oxide content of less than 10% by weight and a CaO content of 5–12% by weight in excess of 5% by weight.

References Cited in the file of this patent

UNITED STATES PATENTS

| | | |
|---|---|---|
| 1,832,153 | Stowener | Nov. 17, 1931 |
| 2,017,428 | Almquist | Oct. 15, 1935 |
| 2,369,106 | Heckel | Feb. 6, 1945 |
| 2,617,774 | Rottig et al. | Nov. 11, 1952 |

FOREIGN PATENTS

| | | |
|---|---|---|
| 896,955 | France | May 8, 1944 |
| 641,332 | Great Britain | Aug. 9, 1950 |